(12) United States Patent
Tsai et al.

(10) Patent No.: US 10,572,061 B2
(45) Date of Patent: Feb. 25, 2020

(54) HYBRID TOUCH MODULE

(71) Applicant: HIGGSTEC INC., Taoyuan (TW)

(72) Inventors: Hung-Yu Tsai, Yilan County (TW); Chang-You Tsai, Yilan County (TW)

(73) Assignee: HIGGSTEC INC., Taoyuan (TW)

( * ) Notice: Subject to any disclaimer, the term of this patent is extended or adjusted under 35 U.S.C. 154(b) by 32 days.

(21) Appl. No.: 15/990,717

(22) Filed: May 28, 2018

(65) Prior Publication Data

US 2019/0361561 A1 Nov. 28, 2019

(51) Int. Cl.
*G06F 3/044* (2006.01)
*G06F 3/045* (2006.01)
*G06F 3/041* (2006.01)

(52) U.S. Cl.
CPC ............ *G06F 3/0416* (2013.01); *G06F 3/044* (2013.01); *G06F 3/045* (2013.01); *G06F 2203/04106* (2013.01)

(58) Field of Classification Search
CPC ........ G06F 3/0416; G06F 3/044; G06F 3/045; G06F 2203/04106
See application file for complete search history.

(56) References Cited

U.S. PATENT DOCUMENTS

| | | | | |
|---|---|---|---|---|
| 8,816,970 B2* | 8/2014 | Wang | .................... | G06F 3/0412 178/18.05 |
| 10,254,888 B2* | 4/2019 | Rosenberg | ............ | G06F 3/0414 |
| 2001/0013855 A1* | 8/2001 | Fricker | ............... | G06F 3/03547 345/156 |
| 2009/0152023 A1* | 6/2009 | Yeh | .......................... | G06F 3/044 178/18.05 |
| 2009/0211891 A1* | 8/2009 | Lai | ........................ | G06F 3/0416 200/512 |
| 2009/0225051 A1* | 9/2009 | Kuo | ........................ | G06F 3/044 345/173 |
| 2010/0231530 A1* | 9/2010 | Lin | ......................... | G06F 3/044 345/173 |
| 2011/0037713 A1* | 2/2011 | Chen | ....................... | G06F 3/041 345/173 |
| 2011/0181548 A1* | 7/2011 | Sekiguchi | ............... | G06F 3/044 345/174 |
| 2011/0298728 A1* | 12/2011 | Kim | ....................... | G06F 3/044 345/173 |

(Continued)

*Primary Examiner* — Ibrahim A Khan
(74) *Attorney, Agent, or Firm* — Li & Cai Intellectual Property (USA) Office

(57) ABSTRACT

A hybrid touch module includes a bottom layer structure, a common layer structure, and a top layer structure. The bottom layer structure includes a conductive layer, and a bezel disposed on the conductive layer. The common layer structure is disposed on the bezel. The common layer structure includes a common film, a resistive conductive layer, and a capacitive conductive layer. The resistive conductive layer and the capacitive conductive layer are disposed on a first surface of the common film. The top layer structure is attached to the common layer structure, and the top layer structure includes an insulation film and an electrode layer disposed on the insulation film. The common layer structure can be cooperated with the bottom layer structure to provide a resistive touch function, and the common layer structure can be cooperated with the top layer structure to provide a capacitive touch function.

4 Claims, 3 Drawing Sheets

(56) References Cited

U.S. PATENT DOCUMENTS

| | | | |
|---|---|---|---|
| 2011/0308929 A1* | 12/2011 | Kim | G06F 3/044 200/600 |
| 2012/0086668 A1* | 4/2012 | Wang | G06F 3/044 345/174 |
| 2012/0194482 A1* | 8/2012 | Kim | G06F 3/0412 345/176 |
| 2012/0200337 A1* | 8/2012 | Liu | G06F 3/044 327/517 |
| 2012/0200516 A1* | 8/2012 | Kim | G06F 3/044 345/173 |
| 2012/0206401 A1* | 8/2012 | Lin | G06F 3/044 345/174 |
| 2013/0021089 A1* | 1/2013 | Sakurai | G06F 3/044 327/517 |
| 2013/0127777 A1 | 5/2013 | Yang | |
| 2015/0091863 A1* | 4/2015 | Lin | G06F 3/044 345/174 |
| 2015/0153887 A1* | 6/2015 | Kim | G06F 3/044 345/173 |
| 2015/0185946 A1* | 7/2015 | Fourie | G06F 3/0416 345/174 |
| 2016/0188050 A1* | 6/2016 | Uchiyama | G06F 3/045 345/174 |
| 2017/0038877 A1* | 2/2017 | Kuboyama | G06F 3/0414 |
| 2017/0336891 A1* | 11/2017 | Rosenberg | G06F 3/0421 |

* cited by examiner

HYBRID TOUCH MODULE

BACKGROUND OF THE INVENTION

1. Field of the Invention

The present disclosure relates to a touch module, and in particular, to a hybrid touch module having a resistive touch function and a capacitive touch function.

2. Description of Related Art

Conventional touch module is classified into a resistive touch module and a capacitive touch module. The resistive touch module performs a touch operation by pressing, which has less restrictions on operating conditions, but is inferior to the capacitive touch module in smoothness of the touch operation (especially for users who often need to write and draw). The capacitive touch module is better in smoothness of the touch operation, but has more restrictions on operating conditions (i.e. the user can not wear gloves when performing the touch operation). In addition, both the resistive touch module and the capacitive touch module have the drawbacks that the user may make a touch error easily when touching the touch module.

In addition, if the resistive touch module and the capacitive touch module are simply combined together (or laminated together) to enable the touch module to have both a resistive touch function and a capacitive touch function, the touch module will have drawbacks that the thickness of the product will be large, the integration degree of the product will be low, and the material cost of the product will be high.

In this regard, the present disclosure provides a hybrid touch module to overcome the aforementioned drawbacks.

SUMMARY OF THE INVENTION

The main object of the present disclosure is to solve the drawbacks associated with the prior art.

The present disclosure provides a hybrid touch module, including: a bottom layer structure including: a substrate; a conductive layer disposed on a top face of the substrate; and a bezel disposed on the conductive layer; a common layer structure disposed on the bezel and spaced apart from the conductive layer, and the common layer structure including: a common film having a first surface and a second surface opposite to the first surface, and the first surface facing the top face of the substrate; a resistive conductive layer disposed on the first surface of the common film; and a capacitive conductive layer disposed on one of the first surface and the second surface of the common film; and a top layer structure attached to the common layer structure, and the top layer structure including: an insulation film having a bottom face facing the second surface of the common film; and an electrode layer disposed on the insulation film; in which the common layer structure is capable of being cooperated with the bottom layer structure so as to provide a resistive touch function, and the common layer structure is capable of being cooperated with the top layer structure so as to provide a capacitive touch function.

The present disclosure also provides a hybrid touch module, including: a bottom layer structure including: a substrate; a conductive layer disposed on a top face of the substrate; and a bezel disposed on the conductive layer; a common layer structure disposed on the bezel and spaced apart from the conductive layer, and the common layer structure including: a common film having a first surface and a second surface opposite to the first surface, and the first surface facing the top face of the substrate; a resistive conductive layer disposed on the first surface of the common film; and a capacitive conductive layer disposed on the second surface of the common film; in which the common layer structure is capable of being cooperated with the bottom layer structure so as to provide a resistive touch function, and the common layer structure is capable of independently providing a capacitive touch function.

The advantage of the present disclosure is that the hybrid touch module of the present disclosure is capable of providing the resistive touch function by virtue of the common layer structure in cooperation with the bottom layer structure, and is capable of providing the capacitive touch function by virtue of the common layer structure in cooperation with the top layer structure (or common layer structure itself). Therefore, when the user performs a touch operation, the hybrid touch module can simultaneously perform the resistive touch function and the capacitive touch function so as to double confirm and prevent touch error. In addition, the hybrid touch module can provide wide-ranging operating conditions for the user. That is, the user can smoothly operate the hybrid touch module under wearing gloves, poor environment, or rain.

Moreover, the hybrid touch module has a high integration degree, a thinner thickness and a low material cost by virtue of the structural design and the positional arrangement of the common layer structure.

For further understanding of the present disclosure, the following embodiments are provided to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

First Embodiment

Figure 1:
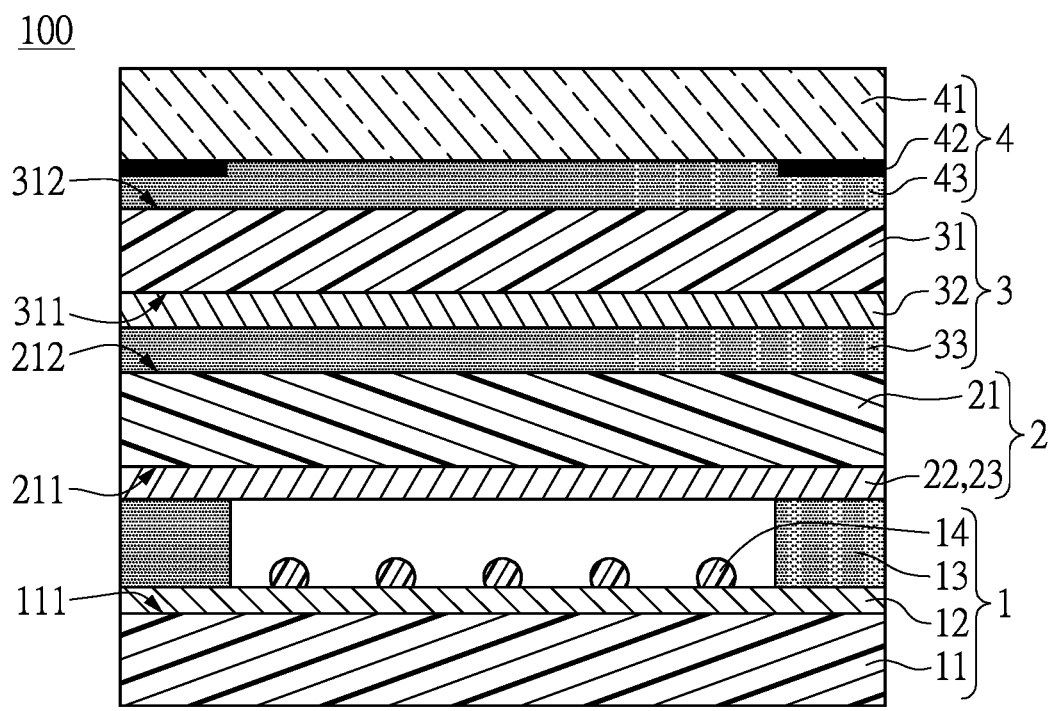
FIG. 1 is a perspective view showing a hybrid touch module according to a first embodiment of the present disclosure.
Figure 2:
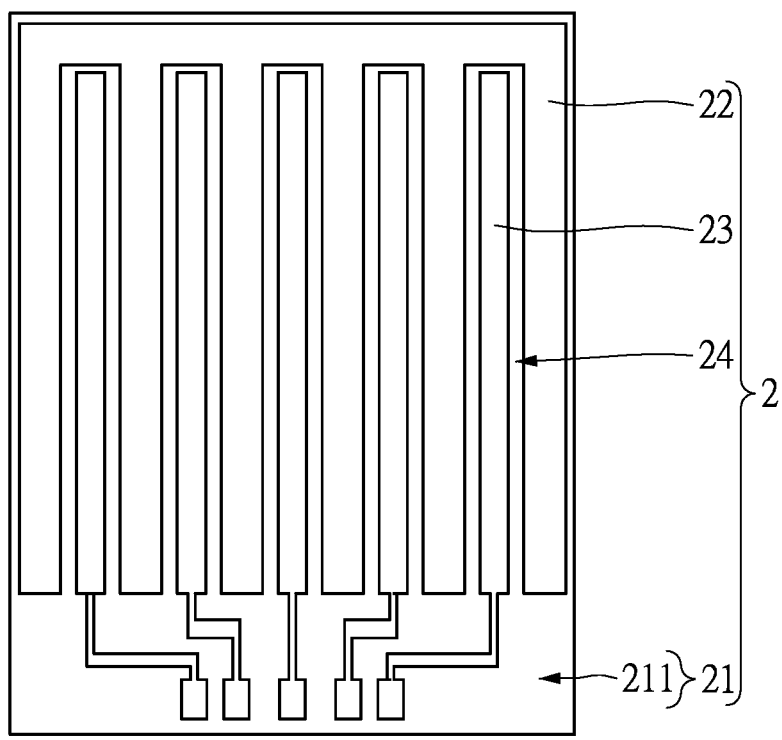
FIG. 2 is a top view of a resistive conductive layer and a capacitive conductive layer of FIG. 1.
Figure 4:
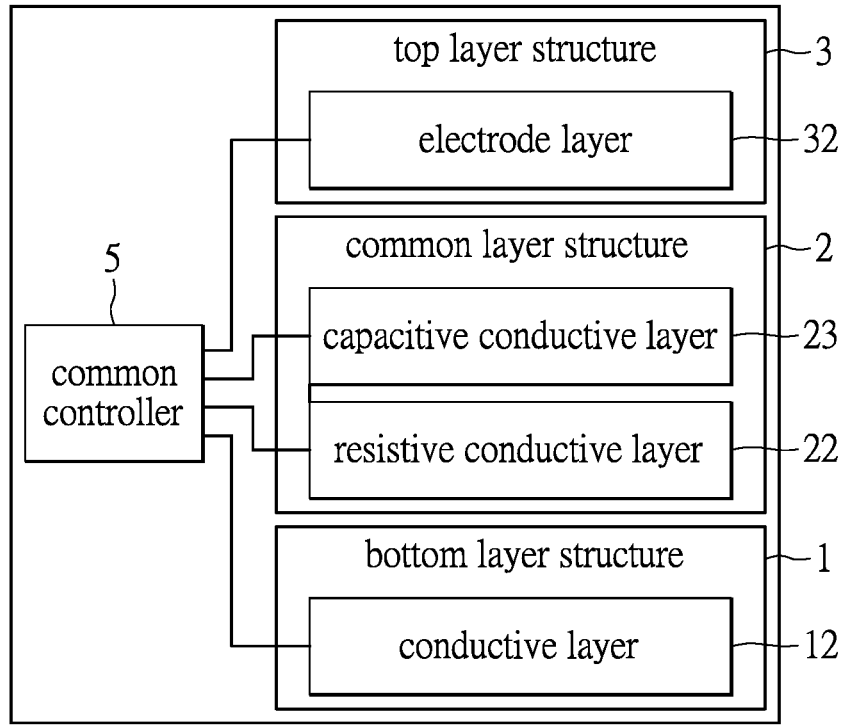
FIG. 4 is a functional block diagram according to the first embodiment and the second embodiment of the present disclosure.

Referring to FIG. 1, FIG. 2, and FIG. 4, which are a first embodiment of the present disclosure. The present embodiment discloses a hybrid touch module 100 capable of providing a resistive touch function and a capacitive touch function, and the hybrid touch module 100 can be applied to electronic products such as smart phones, tablet computers, notebook computers, or industrial computers. The hybrid touch module 100 includes a bottom layer structure 1, a common layer structure 2 disposed on the bottom layer structure 1, a top layer structure 3 attached to the common layer structure 2, and a protection structure 4 attached to the top layer structure 3. In addition, the hybrid touch module 100 further includes a common controller 5 electrically connected to the bottom layer structure 1, the common layer structure 2, and the top layer structure 3 (as shown in FIG. 4). The specific structures of each component of the hybrid touch module 100 in the present embodiment will be individually described, and the connection relationship between the components of the hybrid touch module 100 will be described in due course.

The bottom layer structure 1 includes a substrate 11, a conductive layer 12, a bezel 13, and a plurality of spacers 14. The conductive layer 12 is disposed on a top face 111 of the substrate 11, and the bezel 13 and the spacers 14 are respectively disposed on the conductive layer 12, in which the spacers 14 are separately disposed on the conductive layer 12 and are located at an inner side of the bezel 13.

In the present embodiment, the material of the substrate 11 is preferably, but not limited to, a transparent glass with a thicker thickness and a higher hardness. The material of the conductive layer 12 is preferably, but not limited to, indium Tin Oxide (ITO), fluorine tin oxide (FTO), antimony tin oxide (ATO), or conductive carbon ink. The material of the bezel 13 is preferably, but not limited to, a transparent adhesive (ADH). The material of the spacers 14 is preferably, but not limited to, an insulating spacer dot/member.

More specifically, the substrate 11 is in a rectangular plate shape. The conductive layer 12 is in a film shape and is completely covered on the top face 111 of the substrate 11. The bezel 13 is in a rectangular annular shape and is disposed on a periphery of the conductive layer 12. The spacers 14 are regularly arranged on a portion of the conductive layer 12 where the bezel 13 is not provided, and a height of each spacer 14 is lower than a height of the bezel 13.

The common layer structure 2 is disposed and attached on the bezel 13 and is spaced apart from the conductive layer 12. The common layer structure 2 includes a common film 21, a resistive conductive layer 22, and a capacitive conductive layer 23. The common film 21 has a first surface 211 and a second surface 212 opposite to the first surface 211, and the first surface 211 faces the top face 111 of the substrate 11. That is, the first surface 211 is closer to the top face 111 of the substrate 11 than the second surface 212 is.

In the present embodiment, the common film 21 may be a rectangular film having a shape corresponding to the substrate 11, and the resistive conductive layer 22 and the capacitive conductive layer 23 are commonly disposed on the first surface 211 of the common film 21 (as the symbols 22 and 23 in FIG. 1 are in the same layer structure). More specifically, as shown in FIG. 2, the resistive conductive layer 22 and the capacitive conductive layer 23 are commonly disposed on the first surface 211 of the common film 21 and are spaced apart from each other. The resistive conductive layer 22 includes a plurality of electrode lines, and the capacitive conductive layer 23 also includes a plurality of electrode lines. The electrode lines of the resistive conductive layer 22 surround a plurality of accommodating grooves 24, and the electrode lines of the capacitive conductive layer 23 are respectively disposed in the accommodating grooves 24. Therefore, when the resistive conductive layer 22 and the capacitive conductive layer 23 are commonly disposed on the first surface 211 of the common film 21, the resistive conductive layer 22 and the capacitive conductive layer 23 are not in contact with each other and are electrically insulated from each other.

Please continuously refer to FIG. 1, the spacers 14 of the bottom layer structure 1 face the common layer structure 2 and are spaced apart from the common layer structure 2. Therefore, the spacers 14 can be used to prevent the resistive conductive layer 22 from being in contact with the conductive layer 12 of the bottom layer structure 1 when the resistive conductive layer 22 is not pressed, so as to avoid the occurrence of short circuit or signal misjudgment.

The top layer structure 3 may include an optical transparent glue 33 (i.e. ADH, OCA) such that the top layer structure 3 can be adhered to the common layer structure 2 via the optical transparent glue 33, but the present disclosure is not limited thereto. More specifically, the top layer structure 3 further includes an insulation film 31 and an electrode layer 32 in which the insulation film 31 has a bottom face 311 and a top face 312 opposite to the bottom face 311, and the bottom face 311 of the insulation film 31 faces the second surface 212 of the common film 21. That is, the bottom face 311 is closer to the second surface 212 of the common film 21 than the top face 312 is.

In the present embodiment, the insulation film 31 may be a rectangular film having a shape corresponding to the substrate 11. The electrode layer 32 is in a film shape and is completely covered on the bottom face 311 of the insulation film 31. The electrode layer 32 is spaced apart from the resistive conductive layer 22 and the capacitive conductive layer 23. More specifically, the electrode layer 32 is located between the insulation film 31 and the common film 21, and the electrode layer 32 is adhered to the common film 21 via the optical transparent glue 33.

In the present embodiment, the material of the common film 21 and the insulation film 31 is preferably, but not limited to, a transparent glass or plastic (i.e. polyethylene terephthalate) with a thinner thickness and a lower hardness. The material of the resistive conductive layer 22, the capacitive conductive layer 23, and the electrode layer 32 is preferably, but not limited to, indium Tin Oxide (ITO), fluorine tin oxide (FTO), antimony tin oxide (ATO), or conductive carbon ink.

According to the above configuration, the hybrid touch module 100 of the present embodiment is capable of providing the resistive touch function by virtue of the resistive conductive layer 22 of the common layer structure 2 in cooperation with the conductive layer 12 and the spacers 14 of the bottom layer structure 1.

Since the hybrid touch module 100 has both the resistive touch function and the capacitive touch function, when the user performs a touch operation, the hybrid touch module 100 can simultaneously perform the resistive touch function and the capacitive touch function so as to double confirm and prevent touch error. In addition, the hybrid touch module 100 can provide wide-ranging operating conditions for the user. That is, the user can smoothly operate the hybrid touch module 100 under wearing gloves, poor environment, or rain.

In addition, the hybrid touch module 100 has a high integration degree, a thinner thickness and a low material cost by virtue of the structural design and the positional arrangement of the common layer structure 2 (the resistive touch function and the capacitive touch function are subtly integrated on one device).

Further, the protection structure 4 includes a transparent plate 41 (i.e. cover glass), a mask film 42 (i.e. black ink), and an optical transparent glue 43 (i.e. ADH, OCA). The transparent plate 41 can be adhered to the insulation film 31 of the top layer structure 3 via the optical transparent glue 43, and the transparent plate 41 is located at a side of the top layer structure 3 away from the common layer structure 2 (as located above the top face 312 of the insulation film 31 in FIG. 1). The mask film 42 is located between the transparent plate 41 and the top layer structure 3, and is configured to define a non-visible area of the hybrid touch module 100 (i.e. the black ink portion of the hybrid touch module).

Moreover, a projection area formed by the bezel 13 of the bottom layer structure 1 being orthogonally projected toward the protection structure 4 falls on the mask film 42. Therefore, the bezel 13 and the mask film 42 have a preferred positional arrangement so as not to affect the touch function and the light transmission effect of the hybrid touch module 100.

More specifically, the transparent plate 41 may be a rectangular plate having a shape corresponding to the substrate 11. The mask film 42 is in a rectangular annular shape and is disposed on a periphery of the transparent plate 41 (the shape and the position of the mask film 42 correspond to the bezel 13). A thickness of the mask film 42 is less than a thickness of the transparent plate 41, and is also less than a thickness of the optical transparent glue 43. Preferably, the mask film 42 is partially embedded in the optical transparent glue 43, but the present disclosure is not limited thereto.

Please continuously refer to FIG. 4, the common controller 5 is electrically connected to the conductive layer 12 of the bottom layer structure 1, the resistive conductive layer 22 and the capacitive conductive layer 23 of the common layer structure 2, and the electrode layer 32 of the top layer structure 3. Therefore, the common controller 5 is capable of controlling and performing at least one of the resistive touch function and the capacitive touch function.

It is worth mentioning that since the resistive touch module and the capacitive touch module in the prior art are two independent structures, the resistive touch module and the capacitive touch module are necessary to be respectively and electrically connected to the resistive controller and the capacitive controller so that the size of the product is too large and the production cost of the product is too high. With respect to the above-mentioned drawback, the hybrid touch module 100 of the present embodiment only needs to be electrically connected to the common controller 5 to perform the resistive touch function and the capacitive touch function so that the size of the product can be effectively reduced and the production cost of the product can also be effectively reduced.

Second Embodiment

Figure 3:
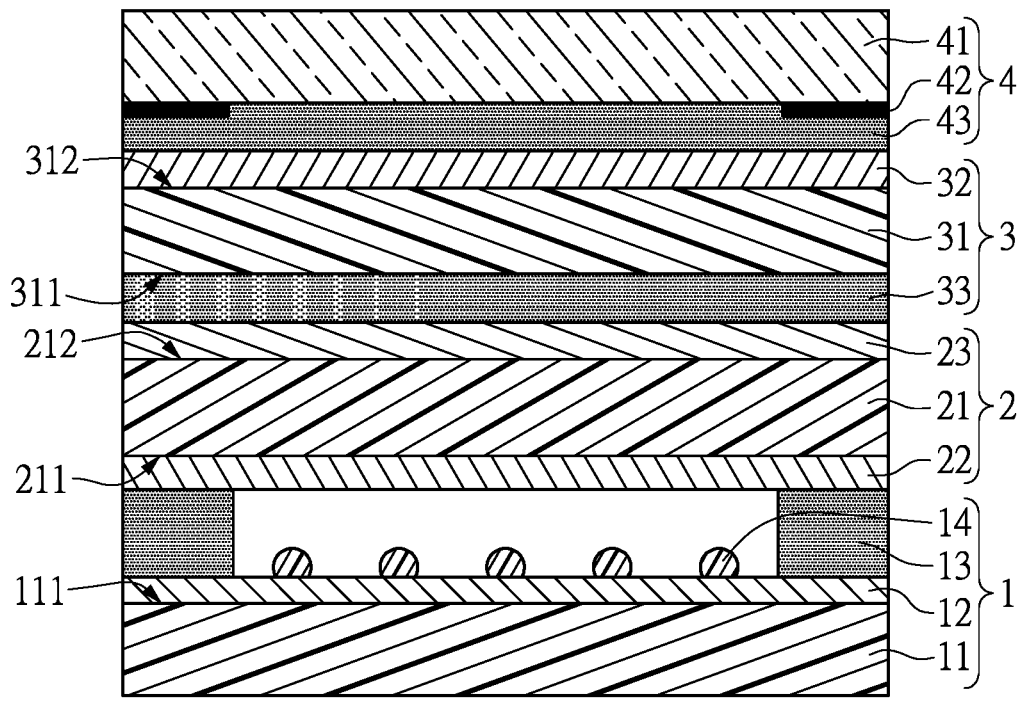
FIG. 3 is a perspective view showing a hybrid touch module according to a second embodiment of the present disclosure.

Referring to FIG. 3, which is a second embodiment of the present disclosure. The present embodiment discloses a hybrid touch module 100 including a bottom layer structure 1, a common layer structure 2, a top layer structure 3, a protection structure 4, and a common controller 5. The structural design and the positional arrangement of the bottom layer structure 1, the protection structure 4, and the common controller 5 of the present embodiment are substantially the same as described in the first embodiment. The difference of the present embodiment compared to the first embodiment is the structural design and the positional arrangement of the common layer structure 2 and the top layer structure 3.

As described in more detail below, in the present embodiment, the capacitive conductive layer 23 of the common layer structure 2 is disposed on the second surface 212 of the common film 21, and the electrode layer 32 of the top layer structure 3 is disposed on the top face 312 of the insulation film 31. That is, the resistive conductive layer 22 and the capacitive conductive layer 23 of the present embodiment are respectively disposed on the first surface 211 and the second surface 212 of the common film 21, and are not commonly disposed on the first surface 211 of the common film 21.

Moreover, in the present embodiment, the electrode layer 32 of the top layer structure 3 is disposed on the top face 312 of the insulation film 31, and is not disposed on the bottom face 311 of the insulation film 31. Therefore, the capacitive conductive layer 23 is located between the common film 21 and the insulation film 31, and the electrode layer 32 is located between the insulation film 31 and the transparent plate 41.

More specifically, the resistive conductive layer 22 and the capacitive conductive layer 23 of the present embodiment are not limited to the structural design as described in the first embodiment (i.e. including a plurality of electrode lines). The resistive conductive layer 22 and the capacitive conductive layer 23 may be, for example, in the form of a thin film and be respectively and completely covered the first surface 211 and the second surface 212 of the common film 21.

Third Embodiment

Figure 5:
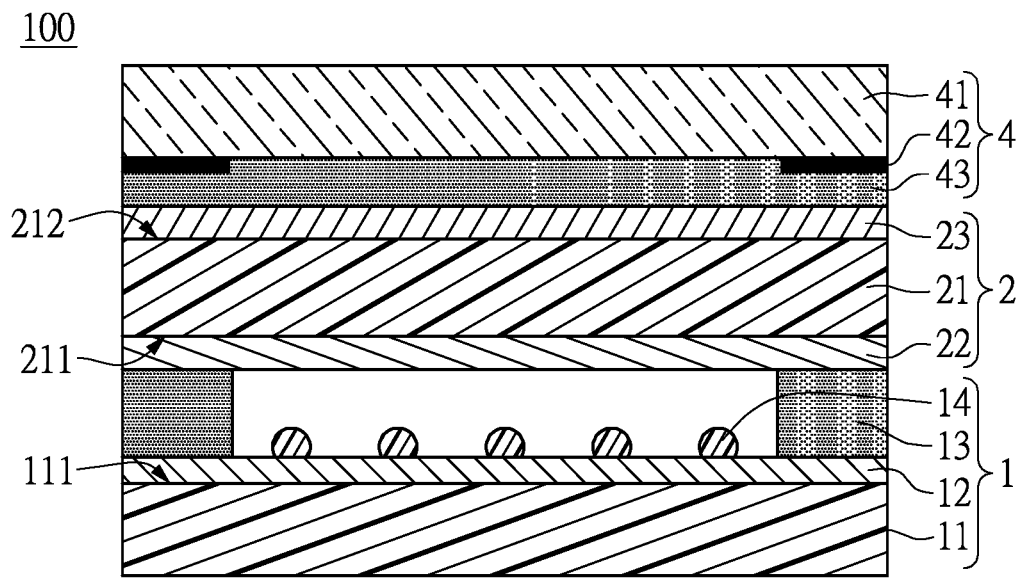
FIG. 5 is a perspective view showing a hybrid touch module according to a third embodiment of the present disclosure.
Figure 6:
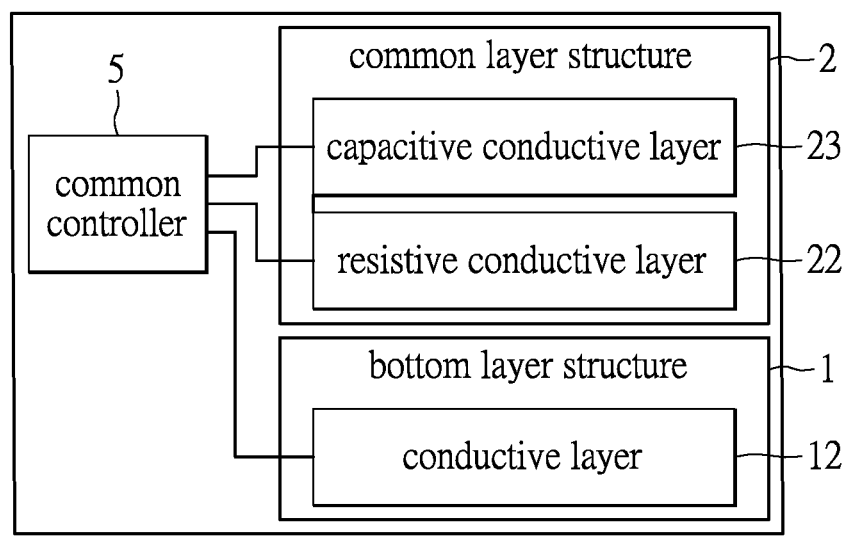
FIG. 6 is a functional block diagram according to the third embodiment of the present disclosure.

Referring to FIG. 5 and FIG. 6, which are a third embodiment of the present disclosure. The present embodiment discloses a hybrid touch module 100 including a bottom layer structure 1, a common layer structure 2, a protection structure 4, and a common controller 5. The structural design of each component of the present embodiment is substantially the same as described in the second embodiment. The difference of the present embodiment compared to the second embodiment is that the hybrid touch module 100 of the present embodiment does not include the top layer structure 3.

As described in more detail below, since the hybrid touch module 100 of the present embodiment does not include the top layer structure 3, the hybrid touch module 100 provides a capacitive touch function via the capacitive conductive layer 23 and the common film 21 of the common layer structure 2. That is, the common layer structure 2 is capable of independently providing the capacitive touch function without being cooperated with other structure layers.

In addition, the transparent plate 41 of the protection structure 4 is disposed and attached on the capacitive conductive layer 23 of the common layer structure 2 via the optical transparent glue 43, and the transparent plate 41 is located at a side of the common layer structure 2 away from the bottom layer structure 1 (as located above the second surface 212 of the common film 21 in FIG. 5). The mask film 42 of the protection structure 4 is located between the transparent plate 41 and the common layer structure 2, and is configured to define a non-visible area of the hybrid touch module 100, in which a projection area formed by the bezel 13 being orthogonally projected toward the protection structure 4 falls on the mask film 42.

Please continuously refer to FIG. 6, the common controller 5 is electrically connected to the conductive layer 12 of the bottom layer structure 1, and the resistive conductive layer 22 and the capacitive conductive layer 23 of the common layer structure 2, such that the common controller 5 is capable of controlling and performing at least one of the resistive touch function and the capacitive touch function.

Advantageous Effects of the Present Disclosure

As described above, the hybrid touch module 100 of the present disclosure is capable of providing the resistive touch function by virtue of the common layer structure 2 in cooperation with the bottom layer structure 1, and is capable of providing the capacitive touch function by virtue of the common layer structure 2 in cooperation with the top layer structure 3 (or common layer structure 2 itself). Therefore, when the user performs a touch operation, the hybrid touch module 100 can simultaneously perform the resistive touch function and the capacitive touch function so as to double confirm and prevent touch error. In addition, the hybrid touch module 100 can provide wide-ranging operating conditions for the user. That is, the user can smoothly operate the hybrid touch module 100 under wearing gloves, poor environment, or rain.

Moreover, the hybrid touch module 100 has a high integration degree, a thinner thickness and a low material cost by virtue of the structural design and the positional arrangement of the common layer structure 2.

The descriptions illustrated supra set fourth simply the preferred embodiment of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A hybrid touch module, comprising:
    a bottom layer structure including:
        a substrate;
        a conductive layer disposed on a top face of the substrate; and
        a bezel disposed on the conductive layer;
    a common layer structure disposed on the bezel and spaced apart from the conductive layer, and the common layer structure including:
        a common film having a first surface and a second surface opposite to the first surface, and the first surface facing the top face of the substrate;
        a resistive conductive layer disposed on the first surface of the common film; and
        a capacitive conductive layer disposed on one of the first surface and the second surface of the common film; and
    a top layer structure attached to the common layer structure, and the top layer structure including:
        an insulation film having a bottom face facing the second surface of the common film; and
        an electrode layer disposed on the insulation film;
    wherein the common layer structure is capable of being cooperated with the bottom layer structure so as to provide a resistive touch function, and the common layer structure is capable of being cooperated with the top layer structure so as to provide a capacitive touch function;
    wherein the resistive conductive layer and the capacitive conductive layer are commonly disposed on the first surface of the common film and are spaced apart from each other, and the electrode layer is disposed on the bottom face of the insulation film;
    wherein the resistive conductive layer surrounds a plurality of accommodating grooves, and the capacitive conductive layer is disposed in the accommodating grooves.

2. The hybrid touch module according to claim 1, further comprising a protection structure, and the protection structure including:
    a transparent plate disposed and attached on the top layer structure, and the transparent plate being located at a side of the top layer structure away from the common layer structure; and
    a mask film located between the transparent plate and the top layer structure, and being configured to define a non-visible area of the hybrid touch module; wherein a projection area formed by the bezel being orthogonally projected toward the protection structure falls on the mask film.

3. The hybrid touch module according to claim 1, further comprising a common controller; wherein the common controller is electrically connected to the conductive layer of the bottom layer structure, the resistive conductive layer and the capacitive conductive layer of the common layer structure, and the electrode layer of the top layer structure, such that the common controller is capable of controlling and performing at least one of the resistive touch function and the capacitive touch function.

4. The hybrid touch module according to claim 1, wherein the bottom layer structure includes a plurality of spacers separately disposed on the conductive layer, and the spacers face the common layer structure and are spaced apart from the common layer structure.

* * * * *